(12) United States Patent
Norton

(10) Patent No.: US 11,691,294 B2
(45) Date of Patent: Jul. 4, 2023

(54) ROBOTIC TOOL CHANGER COUPLING MECHANISM WITH INCREASED TORSIONAL STIFFNESS

(71) Applicant: ATI Industrial Automation, Inc., Apex, NC (US)

(72) Inventor: Daniel Allen Norton, Apex, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 316 days.

(21) Appl. No.: 17/027,931

(22) Filed: Sep. 22, 2020

(65) Prior Publication Data

US 2022/0088798 A1    Mar. 24, 2022

(51) Int. Cl.
  *B25J 15/04* (2006.01)
  *B25J 15/00* (2006.01)

(52) U.S. Cl.
  CPC ....... *B25J 15/0416* (2013.01); *B25J 15/0019* (2013.01)

(58) Field of Classification Search
  CPC ........ B23Q 3/102; B23Q 3/103; B23Q 3/105; B23Q 1/0072; F16B 1/005; F16B 2/16; F16B 2/18; F16B 2/04; F16B 21/073; B25B 1/08; B25B 5/087; B23B 31/1071; B23B 2260/02
  USPC ............ 269/43, 54, 136, 138, 166, 244, 271
  See application file for complete search history.

(56) References Cited

U.S. PATENT DOCUMENTS

| | | | | |
|---|---|---|---|---|
| 5,211,501 A * | 5/1993 | Nakamura | ............... | B25J 15/04 403/328 |
| 8,005,570 B2 * | 8/2011 | Gloden | .................... | B25J 15/04 403/322.2 |
| 8,209,840 B2 * | 7/2012 | Norton | ............... | B23B 31/1071 403/322.2 |
| 8,500,132 B2 * | 8/2013 | Norton | ..................... | B25J 15/04 279/81 |
| 8,601,667 B2 * | 12/2013 | Norton | ............... | B23B 31/1071 279/81 |
| 8,794,418 B1 | 8/2014 | Norton | | |
| 9,151,343 B2 * | 10/2015 | Norton | ................. | B25J 17/0233 |
| 10,047,908 B1 * | 8/2018 | Bohle, II | ............. | B25J 15/0466 |
| 2005/0238420 A1 * | 10/2005 | Hansson | ............. | B25J 19/0041 403/109.3 |
| 2019/0255713 A1 * | 8/2019 | Churchill | ............. | B25J 15/0416 |
| 2021/0387357 A1 | 12/2021 | Kendrick et al. | | |

\* cited by examiner

*Primary Examiner* — Lee D Wilson
*Assistant Examiner* — Robert F Neibaur
(74) *Attorney, Agent, or Firm* — Coats & Bennett, PLLC

(57) ABSTRACT

A robotic tool changer includes master and tool assemblies. When the master and tool assemblies are coupled, rolling members project from the master assembly and contact opposed sloped surfaces of a plurality of cutouts formed in a bearing race in the tool assembly. By contacting opposed sloped surfaces of a plurality of cutouts with the rolling members, torsional freeplay between the master and tool assemblies is eliminated or minimized.

14 Claims, 8 Drawing Sheets

FIG. 5A                    FIG. 5B

ROBOTIC TOOL CHANGER COUPLING MECHANISM WITH INCREASED TORSIONAL STIFFNESS

FIELD OF INVENTION

The present invention relates generally to robotic tool changers, and in particular to a robotic tool changer having a coupling mechanism that achieves increased torsional rigidity and reduced freeplay.

BACKGROUND

Industrial robots have become an indispensable part of modern manufacturing. Whether transferring semiconductor wafers from one process chamber to another in a cleanroom or cutting and welding steel on the floor of an automobile manufacturing plant, robots perform many manufacturing tasks tirelessly, in hostile environments, and with high precision and repeatability.

In many robotic manufacturing applications, the considerable cost of an industrial robot is amortized over a variety of tasks by providing different tools, or end effectors, that may be coupled to a general-purpose robotic arm. For example, in an automotive manufacturing application, a robot may be utilized to cut, grind, or otherwise shape metal parts during one production run, and perform a variety of spot welding tasks in another. Furthermore, even in performing one type of task, a robot may utilize different tools. For example, different welding tool geometries may be advantageously mated to a particular robot to perform welding tasks at different locations or in different orientations.

In these applications, a robotic tool changer is used to mate different tools to the robot. One half of the tool changer, called the master assembly, is permanently affixed to a robot arm. The other half, called the tool assembly, is affixed to each tool that the robot may utilize. When a robotic controller aligns the master assembly at the end of a robot arm to a tool assembly attached to the desired tool, it directs the master assembly to mechanically couple to the tool assembly, thus attaching the tool to the robot. Robotic tool changers also facilitate the provision of utilities—such as electrical current, air pressure, hydraulic fluid, cooling water, and the like—to the tool, and the transfer of data from some tools back to a robotic controller.

A ball-lock configuration is commonly deployed in robotic tool changers as a coupling mechanism. In one such configuration, a plurality of rolling members, such as steel balls, is contained in a collar of the master assembly, which is disposed within a chamber of a tool assembly. The balls are driven radially, such as by an advancing piston, and advance to bear against a bearing race in the tool assembly, mechanically coupling the master and tool assemblies together. To decouple, the piston is retracted, and the balls retreat into the collar as the master assembly separates from the tool assembly. Various configurations, driving mechanisms, and operational aspects of such ball-lock configurations are described in U.S. Pat. Nos. 8,005,570; 8,132,816; 8,209,840; 8,500,132; 8,533,930; 8,601,667; 8,794,418; 9,151,343; 9,724,830; and 10,335,957. All of these patents are assigned to the assignee of the present application, and the disclosures of all of them are incorporated herein by reference in their entireties.

Alignment is required between master and tool assemblies for proper mechanical coupling of the ball-lock mechanism to the tool assembly bearing race, and for the coupling of utility-passing modules attached to the master and tool assemblies. This alignment is typically accomplished by one or more alignment pins on the master assembly which interface with corresponding alignment bushings in the tool assembly. In addition, these alignment pins and bushings also provide torsional rigidity to the coupled tool when the robot is in operation. To prevent binding, a small amount of diametral clearance is required between an alignment pin and its associated alignment bushing. This miniscule clearance is the primary source of rotational freeplay in the tool changer, which negatively affects positional repeatability and torsional stiffness. This effect is magnified in large end-of-arm tools, and can result in undesirable variation or position error at the point of work on each end effector. Freeplay also creates problems with electrical signal modules attached to tool changers, because the contact pins on the master and tool sides are allowed to move with respect to each other, possibly causing intermittent signal loss. It can also cause excessive wear from the shifting back and forth, which leads to premature failure.

To reduce torsional freeplay, it is known to machine spherical or cylindrical pockets—referred to herein as "scallops"—into the tool bearing race in the tool assembly, at the corresponding location of each rolling member. These features reduce freeplay, but do not eliminate it. One drawback of known designs is the scallop features must inherently have larger radii than their corresponding rolling members, to prevent binding. This diametral clearance provides a miniscule amount of freedom for the rolling members to rock back-and-forth within their respective scallops under reversing torsional loads. For the purpose of coupling, each rolling member is under 3-point contact, with one point of contact being the bottom of the bore in the master assembly collar, a second point of contact being the bottom of the scallop in the tool bearing race, and a third point being located on the tapered piston cam. These three points of contact are positioned on the same plane and approximately 120 degrees apart, although the point of contact on the piston or other mechanism advancing the rolling members does not carry significant torsional coupling load. This 3-point contact scheme, combined with even micro clearance, is enough to create deleterious torsional freeplay in the tool changer.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

The robotic tool changer disclosed is configured to reduce or minimize torsional freeplay and enhance torsional stiffness. As noted above, when the master and tool assemblies of a robotic tool changer are coupled, there is often weakness in the torsional stiffness and this results in freeplay about the z-axis of the tool changer. To address torsional stiffness, the bearing race of the tool assembly is provided with a plurality of circumferentially spaced scalloped cutouts or pockets. Each cutout includes a valley and opposing sloped surfaces, that is sloped surfaces on each side of the valley. In one embodiment, master and tool assemblies are coupled by forcing a plurality of rolling members into contact with opposing sloped surfaces of targeted cutouts. That is, some rolling members contact one of the sloped surfaces of a number of cutouts while other rolling members contact the opposite sloped surfaces of other cutouts. Hence, the resulting rolling members—sloped surfaces contacts prevents or minimizes relative rotation between the master and tool assemblies.

In one embodiment, the scalloped cutouts are equally spaced around the bearing race. Misalignment between rolling members and cutouts is achieved by altering the rolling member—bore pattern in the master assembly. Unlike the cutouts, all of the bores in the master assembly are not equally spaced. Two pairs of aligned bores are slightly skewed relative to the position of target cutouts. This results in the rolling members of the two pair of bores contacting opposing sloped surfaces of a plurality of cutouts.

Other objects and advantages of the present invention will become apparent and obvious from a study of the following description and the accompanying drawings which are merely illustrative of such invention.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

FIG. 5A illustrates the contact of one rolling member with the right side sloped surface of a cutout.

FIG. 5B illustrates the contact of one rolling member with the left side sloped surface of a cutout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1:
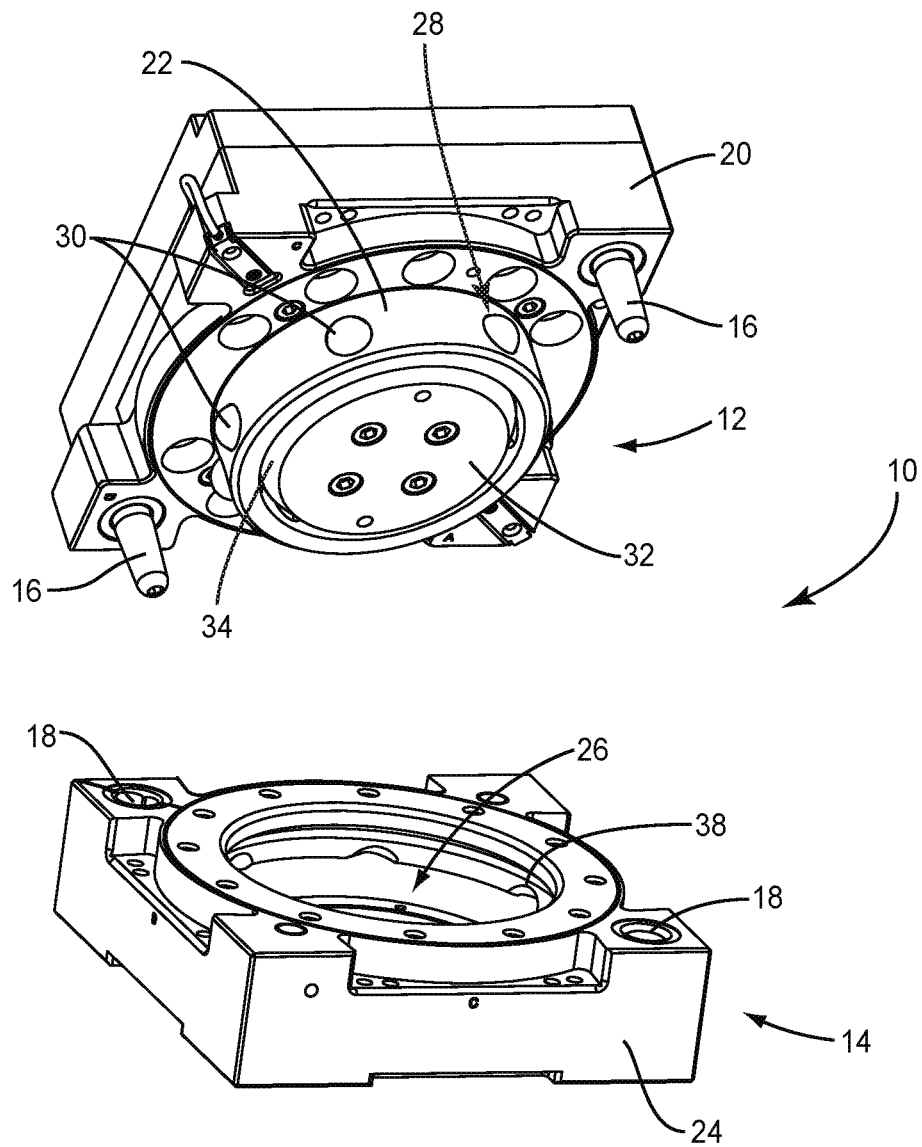
FIG. 1 is a perspective view of a robotic tool changer.

FIG. 1 shows a robotic tool changer 10 which employs a ball-lock coupling mechanism. One half of the robotic tool changer 10, called the master assembly 12, is permanently affixed to a robot arm (not shown). The other half, called the tool assembly 14, is affixed to each tool (not shown) that the robot may utilize. In any particular application, these mountings may be reversed. Accordingly, as used herein, the term "master" and "tool" are terms of reference. As seen in FIG. 1, alignment pins 16 on the master assembly 12 mate with alignment bushings 18 on the tool assembly 14 to insure proper alignment of the master and tool assemblies 12, 14 when the assemblies are coupled together.

Figure 2:
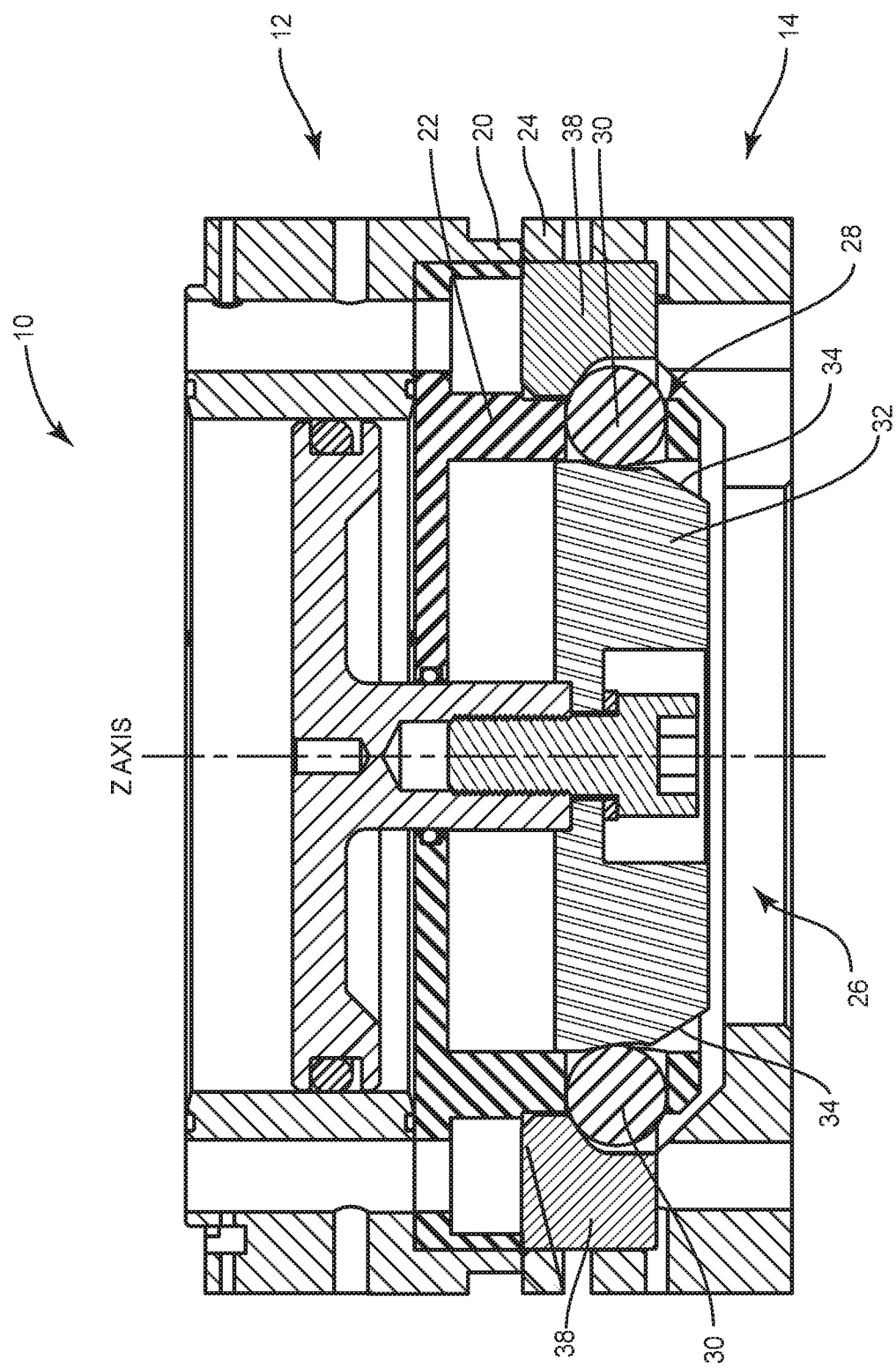
FIG. 2 is a cross-sectional view of the robotic tool changer in a coupled state.

Master assembly 12 includes a housing 20 and an annular collar 22 protruding therefrom and extending beyond the plane of the face of the housing 20. Tool assembly 14 includes a housing 24 and a circular chamber 26 formed therein. Disposed in the chamber 26 is a bearing race 38. Formed in the bearing race 38 is a series of circumferentially spaced scalloped cutouts or pockets 40 (see FIGS. 3A, 3B). As shown in FIG. 2, when the master and tool assemblies 12, 14 are coupled, collar 22 is disposed within the chamber 26 and is spaced inwardly from the bearing race 38.

A plurality of bores 28 is formed in the collar 22 and extend therethrough. Bores 28 are circumferentially spaced around the collar 22. Bores 28 may be tapered, having a slightly larger diameter at the inner surface of the collar 22 than at the outer surface of the collar 22. Disposed in each bore 28 is a rolling member 30, such as a spherical ball. Each rolling member 30 is retained within the collar by a tapered bore 28 which has a diameter at the exterior surface of the collar 22 that is slightly less than the diameter of the corresponding rolling member 30. Accordingly, the rolling member 30 moves between a retracted position where the outermost surface of the rolling member is flush with or interior to the outer surface of the collar 22, and an extended position where each rolling member 30 extends past the outer surface of the collar 22 by an amount that is typically slightly less than the radius of the rolling member 30.

In this embodiment, a cam 32 affixed to the end of a pneumatic piston is disposed within the interior space defined by the collar 22. Cam 32 has at least one tapered surface 34 which contacts the rolling members 30 during coupling of the master and tool assemblies. Tapered surface 34 is aligned such that it engages the rolling members 30 and displaces the rolling members radially outwardly through the bores 28 as the cam advances towards the tool assembly 14 to couple the master and tool assemblies 12, 14. To decouple, as the cam 32 retracts into the master assembly 12, it creates space allowing the rolling members 30 to retract within the collar 28. In some embodiments, the rolling members 30 may be advanced and retracted by a mechanism other than a cam attached to a pneumatic piston, as described in the above incorporated patents, U.S. Pat. Nos. 8,132,816 and 8,209,840.

FIG. 2 is a sectional view of the robotic tool changer 10 showing the master and tool assemblies 12, 14 coupled. Cam 32 is configured to move between a retracted position and an extended position. The term "configured to" used herein and in the claims means "designed to". In FIG. 2, cam 32 assumes the extended position. Movement of the cam 32 is controlled by a robotic controller (not shown). As cam 32 moves from the retracted position to the extended position, it engages the rolling members 30 and urges them outwardly through the bores 28. In the fully extended position, cam 32 moves the rolling members 30 into contact with the scalloped cutouts 40 formed in the bearing race 38 of the tool assembly 14. Details of how the rolling members 30 contact portions of the cutouts 40 are dealt with subsequently herein. In any event, FIG. 2 shows the master and tool assemblies 12, 14 coupled. The Z axis of the robotic tool changer 10 is shown in FIG. 2. When the robotic tool changer is coupled, the Z axis extends through the centers of the collar 22 and the bearing race 38. As discussed below, the collar 22, bores 28, rolling members 30 and cutouts 40 are configured to prevent or minimize relative rotation about the Z axis.

Figures 3A, 3B:
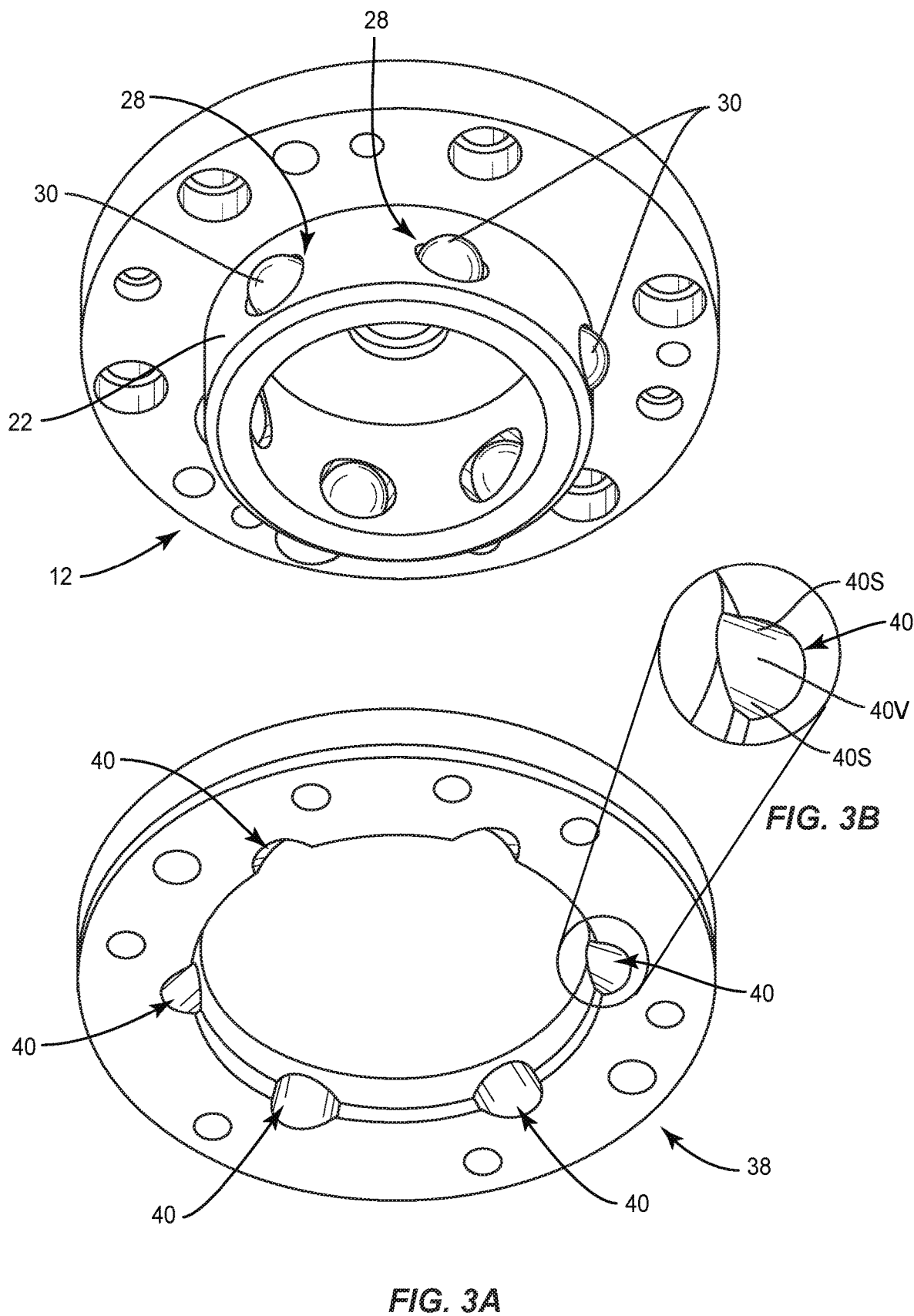
FIG. 3A is a perspective view showing the annular collar of the master assembly and the bearing race of the tool assembly.
FIG. 3B is an enlarged view of one of the scalloped cutouts found in the bearing race.
Figure 3C:
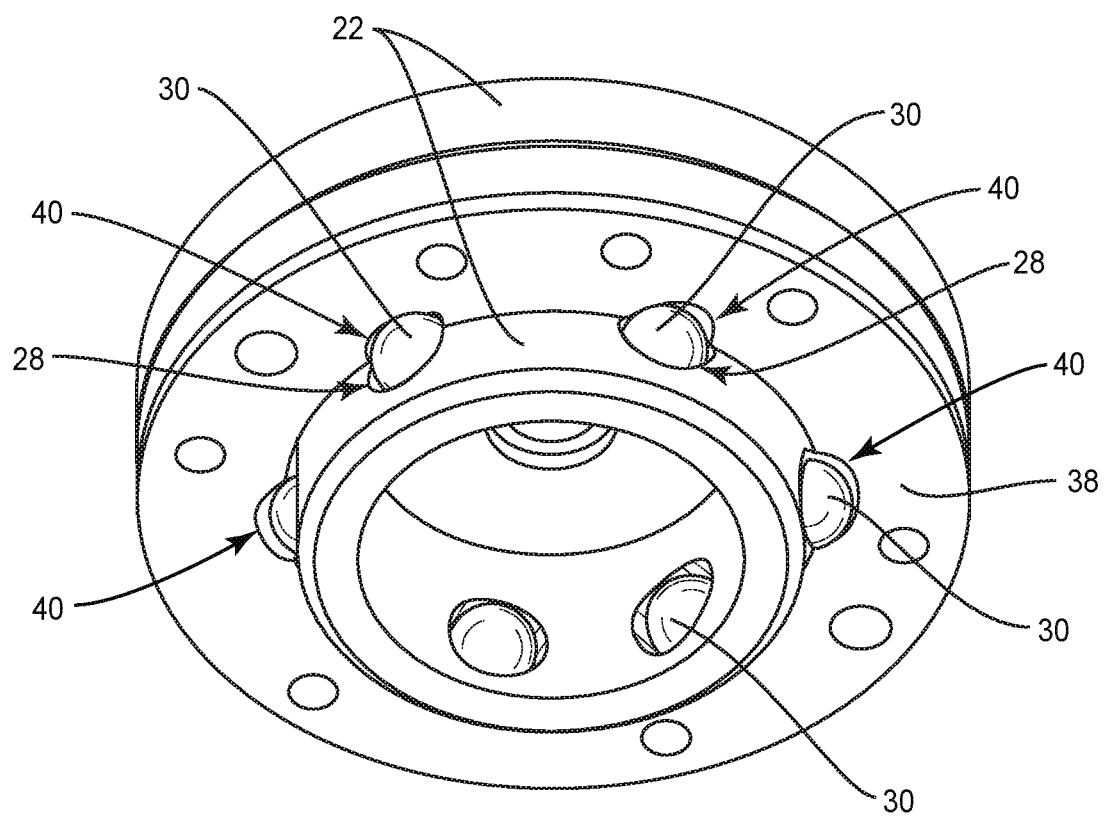
FIG. 3C is a perspective view showing the annular collar and the bearing race and further showing the rolling members contained in bores formed in the annular collar contacting sloped surfaces of the cutouts in the bearing race.

FIG. 3A shows portions of the master and tool assemblies 12, 14. In this embodiment, collar 22 includes six bores 28 and six rolling members 30. The number of bores and rolling members can vary. Bores 28 are circumferentially spaced around collar 22 and are arranged such that pairs of bores are aligned. Hence, pairs of the rolling members 30 are also aligned. As also shown in FIG. 3A, the scalloped cutouts 40 are circumferentially spaced around the bearing race 38 of the tool assembly 14. Pairs of the scalloped cutouts 40 are also aligned. Hence, when cam 32 is fully extended, the rolling members 30 project outwardly from the collar 22 and contact portions of scalloped cutouts or pockets 40. As discussed below, at least some of the rolling members 30 do not seat squarely in the center of the scalloped cutouts 40. That is, some of the rolling members 30 are slightly misaligned with the scalloped cutouts 40.

Each scalloped cutout 40 includes a valley 40V and opposed sloped surfaces 40S extending from the valley. See FIGS. 3A and 3B. Valley 40V lies in the center of the scalloped cutout 40. Sloped surfaces 40S lie on each side of the valley 40V. Facing one of the cutouts 40 as a point of reference, one of the sloped surfaces is referred to as the left sloped surface and the other sloped surface is referred to as the right sloped surface. The term "opposed sloped surface" or "opposing sloped surfaces" is referring to the left and right sloped surfaces of a cutout 40. In the embodiments illustrated, the sloped surfaces 40S are curved. The radius of curvature can vary. It must be sufficient for the rolling member 30 to contact one of the sloped surfaces 40S and at the same time to be at least slightly offset with respect to the center of the cutout. As discussed further below, the robotic tool changer 10 is designed such that at least some of the rolling members 30 engage and contact the sloped surfaces 40S—not the valley 40V—when the master and tool assemblies 12, 14 are coupled. See FIGS. 5A and 5B.

In one embodiment, two rolling members contact the right sloped surface of opposing cutouts while two other rolling members contact the left sloped surface of other opposing cutouts. See FIGS. 4 and 5. To provide for this contact pattern, some of the bores 28 and their rolling members 30 are misaligned with target cutouts, a target cutout being a cutout that during coupling is the object of a rolling member 30. When seated on one of these sloped surfaces 40S of a cutout 40, the rolling member 30 is slightly offset with respect to the valley 40V of the cutout. Since left and right sloped surfaces of a plurality of contacts 40 are contacted by multiple rolling members 30, relative rotation between the master and tool assemblies 12, 14 is prevented or minimized. This contributes to the torsional stiffness of the robotic tool changer 10.

Figure 4:
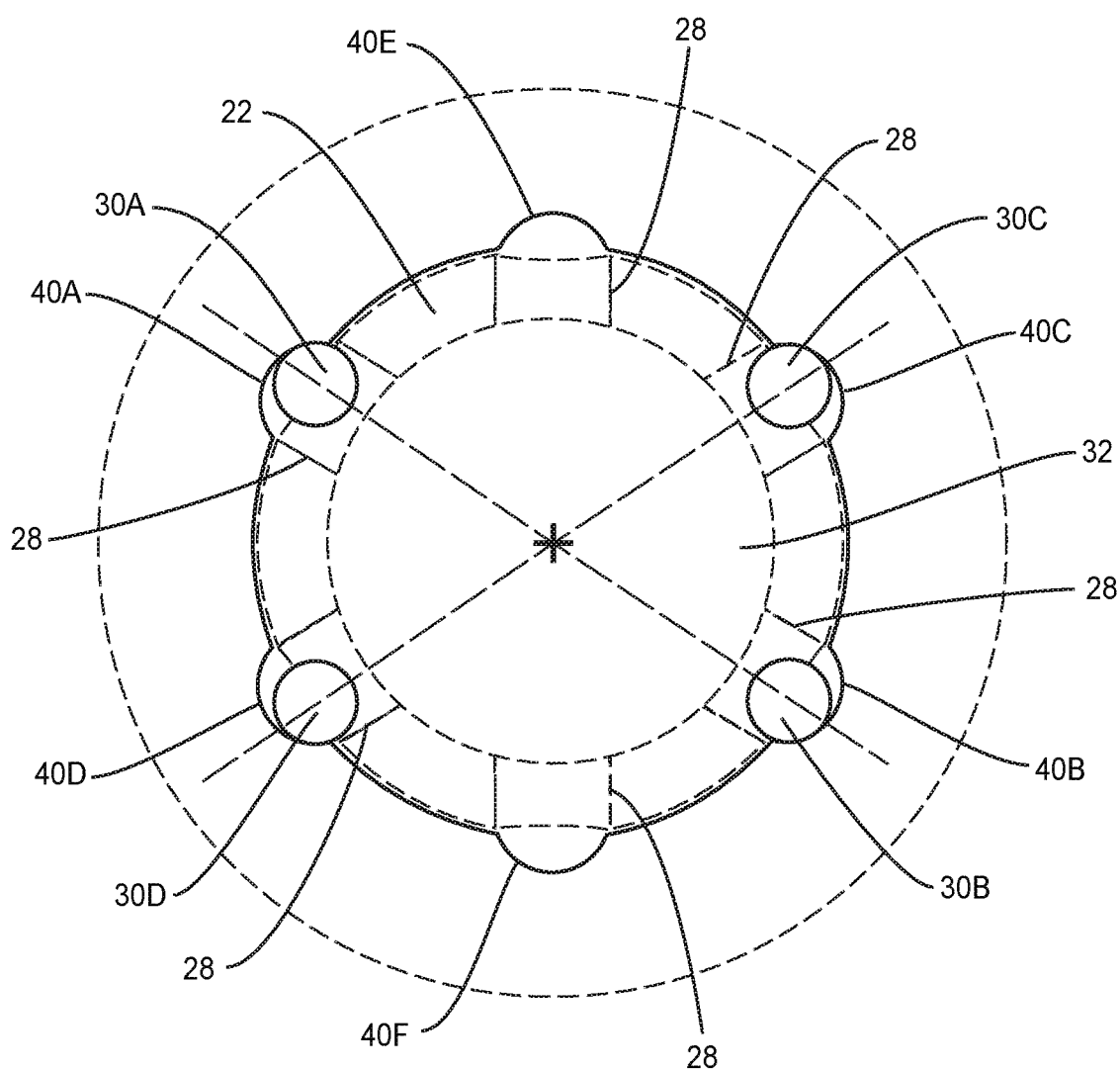
FIG. 4 is a schematic illustration showing a series of rolling members contacting opposed sloped surfaces of various cutouts in the bearing race.

FIG. 4 schematically illustrates these principles. Here there are four rolling members (30A, 30B, 30C and 30D) contacting sloped surfaces of four cutouts (40A, 40B, 40C and 40D). Note the center lines of the opposing rolling members 30 are slightly offset with respect to the center or valley 40V of targeted cutouts. Rolling members 30A and 30B contact right sloped surfaces of cutouts 40A and 40B. This prevents or minimizes the cutouts and hence the tool assembly 14 from rotating counterclockwise with respect to the master assembly 12. In like fashion, rolling members 30C and 30D contact left sloped surfaces of cutouts 40C and 40D. This prevents or minimizes the cutouts and hence the tool assembly 14 from rotating clockwise with respect to the master assembly 12. Thus, there is very little, if any, relative rotation between the master and tool assemblies 12, 14 and this results in an enhancement of the torsional stiffness of the tool changer 10.

Figure 5:
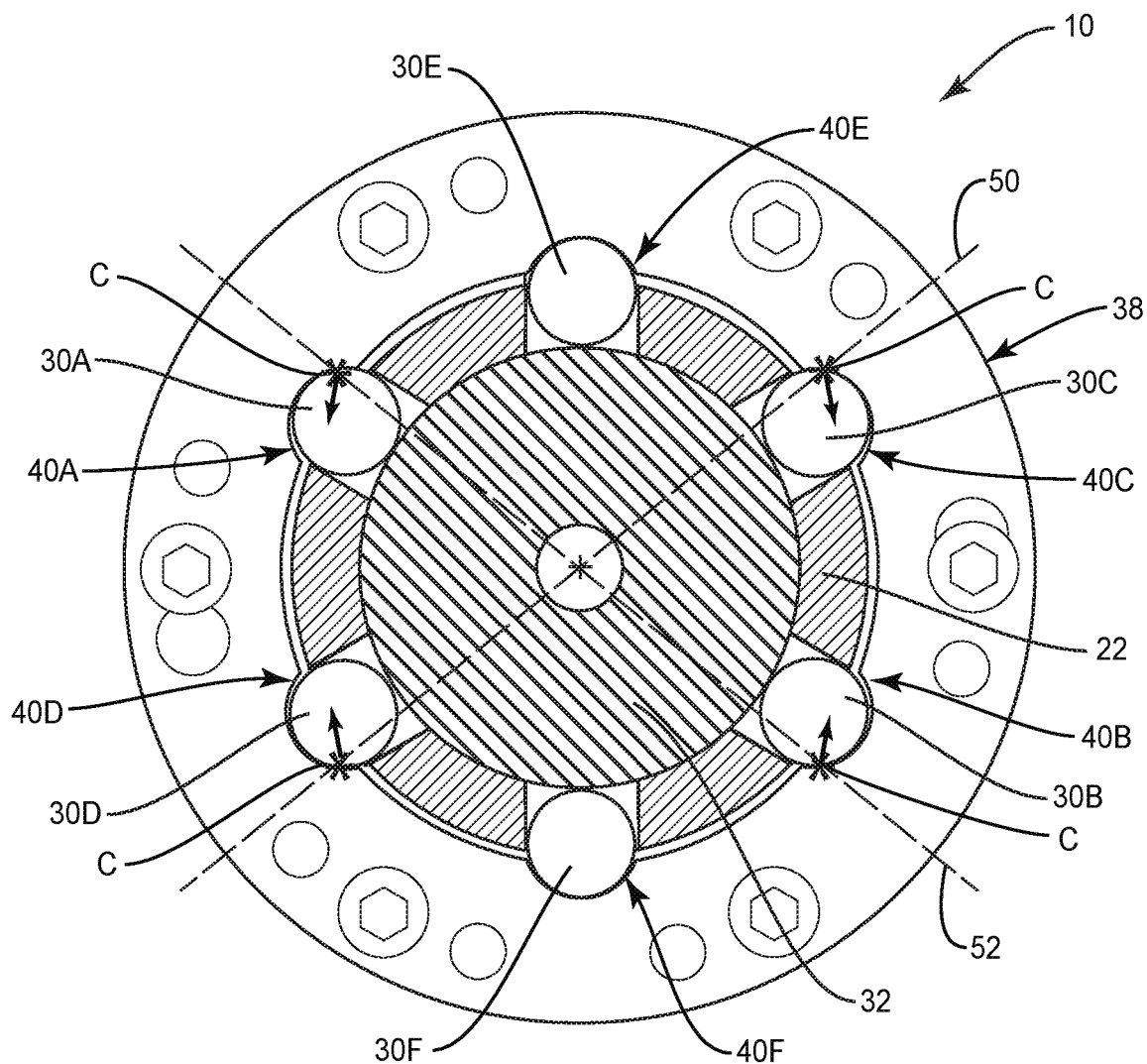
FIG. 5 is a cross-sectional view illustrating the points of contact between a plurality of rolling members and the sloped surfaces of various cutouts and the resulting force vectors.
Figure 5:
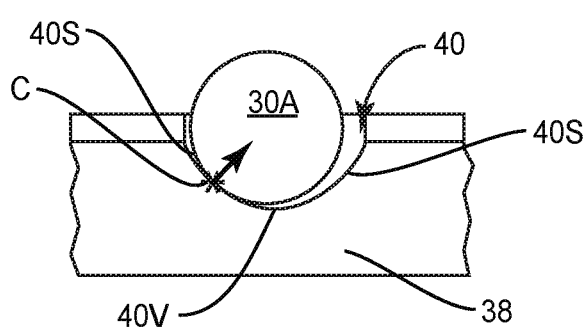
Figure 5:
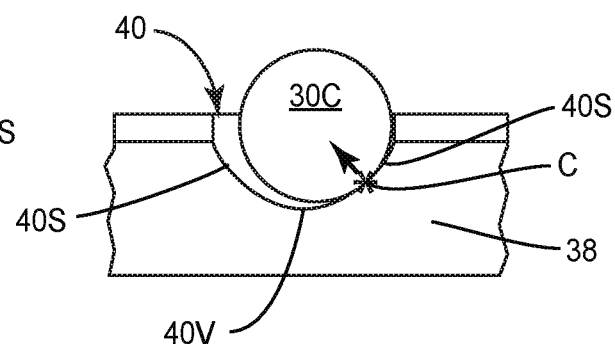

FIG. 5 is a horizontal sectional view of the tool changer 10. It is similar in some respects to FIG. 4 but more detailed inasmuch as it shows all of the rolling members contacting respective cutouts. Also shown are contact points C of rolling members 30A, 30B, 30C and 30D and the resulting force vectors. In addition to these four rolling members, there are two additional rolling members 30E and 30F shown seated in cutouts 40E and 40F. Unlike the other rolling members, rolling members 30E and 30F squarely seat in opposing cutouts 40E and 40F. This effectively reinforces the connection between the master and tool assemblies 12, 14. Note the contact points C along reference lines 50, 52. Reference lines 50, 52 extend through the contact points C and form an "X". FIG. 5 shows the resulting force vectors that result from the contact of a rolling member with sloped surfaces 40S of respective cutouts 40. On each side of the tool changer 10, the resulting force vectors are generally opposed and this prevents or at least minimizes relative rotation between the master and tool assemblies 12, 14.

Figure 6:
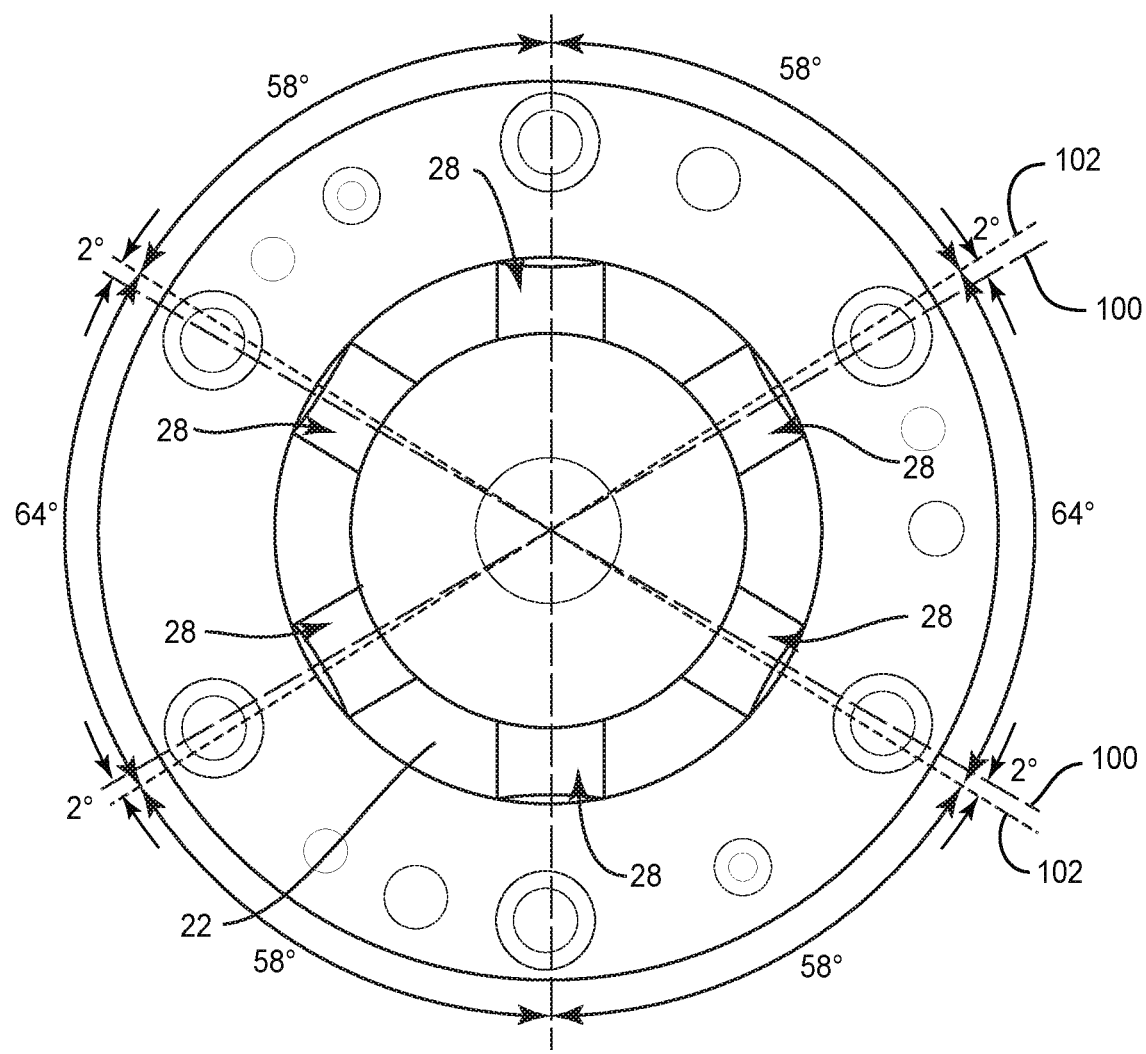
FIG. 6 is a diagrammatic view illustrating the skewing of selected bores in the master assembly in order to give rise to misalignment of selected bores with various cutouts in the bearing race.

There are various ways to misalign the bores 28 and the rolling members 30 therein with target cutouts 40. One approach is to vary the angular spacing of the bores 28 or the cutouts 40 such that when the master and tool assemblies 12, 14 are coupled, selected bores are not precisely aligned with target cutouts 40. As a practical consideration, it may be preferable to make this adjustment with respect to the bores 28 so that the master assembly 12 appropriately mates with existing tool assemblies 14 in the field. FIG. 6 is a schematic illustration showing exemplary spacing of the bores that results in this misalignment. Reference lines 100 (the long dashed lines) show the annular collar 22 divided into six equal quadrants, each quadrant being a 60° quadrant. In this example, reference lines 100 will align with the center of the scalloped cutouts 40 when the master and tool assemblies 12, 14 are coupled. Reference lines 102 show the center lines of selected bores 28 that have been slightly skewed relative to reference lines 100. This, of course, means that when the master and tool assemblies 12, 14 are coupled, the rolling members 30 in these four bores are misaligned with respect to target cutouts 40. The degree of angular variation between reference lines 100 and 102 can vary. In this example, the difference is approximately 2°.

This same effect can be achieved by offsetting the rolling member—bore planes slightly. That is, the rolling member—bore planes are slightly offset so that selected rolling members 30 contact opposed sloped surfaces 40S of the cutouts 40.

Figure 7:
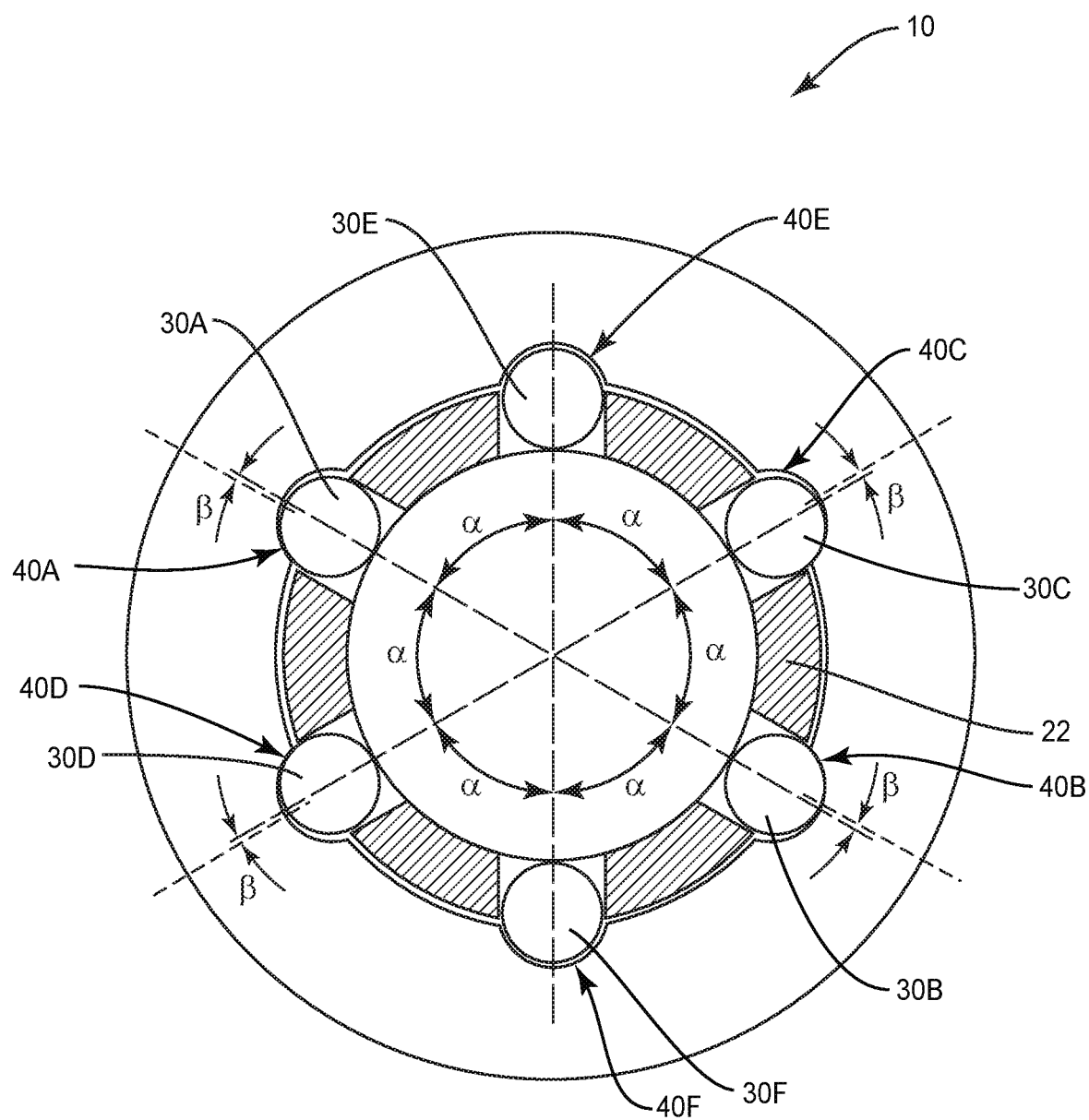
FIG. 7 illustrates an alternate embodiment and is a diagrammatic view illustrating the skewing of selected cutouts in the tool assembly in order to give rise to a misalignment of selected bores and the rolling members therein with various cutouts in the bearing race of the tool assembly.

FIG. 7 illustrates an alternate embodiment where selected cutouts 40A, 40B, 40C and 40D are slightly skewed with respect to the targeted rolling members 30A, 30B, 30C and 30D, which gives rise to the misalignment of selected cutouts with the targeted rolling members. This embodiment is similar to the embodiment shown in FIG. 5 with the difference being that in the embodiment of FIG. 7, the bores and rolling members are all equally spaced while four of the cutouts 40A, 40B, 40C and 40D are slightly skewed with respect to four rolling members 30A, 30B, 30C and 30D. This skew in FIG. 7 is illustrated by the angle β while the angle α represents the equal spacing of the bores and the rolling members 30A-30F. Like the embodiment illustrated in FIGS. 5 and 6, this relationship between respective cutouts and rolling members results in force vectors that arise because of the contact of a rolling member with sloped surfaces 40S of respective cutout 40. The resulting force vectors are generally opposed and this prevents or at least minimizes relative rotation between the master and tool assemblies 12, 14.

Embodiments of the present invention present numerous advantages over the prior art. In the FIG. 5 embodiment, for example, opposing contact forces are applied to two rolling members on each side of the tool changer 10. See the four force vectors depicted in FIG. 5. Accordingly, these opposed forces restrain the respective rolling members 30 from side-to-side motion. By some rolling members 30 contacting the left sloped surfaces of some cutouts 40 and other rolling members contacting the right sloped surfaces of other cutouts, these points of contact virtually eliminate torsional freeplay in the robotic tool changer 10.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A robotic tool changer comprising:
   a tool assembly including:
      a bearing race;
      a plurality of circumferentially spaced scalloped cutouts formed in the bearing race, each cutout including a valley and opposite sloped surfaces;
   a master assembly including:
      an array of bores, each bore configured to contain a rolling member;
      a drive mechanism configured to force the rolling members into the cutouts to couple the master and tool assemblies, and to allow the rolling members to retract to decouple the master and tool assemblies;
   wherein a plurality of the bores in the array of bores and the rolling members therein are misaligned with select cutouts of the scalloped cutouts; and
   wherein when the master and tool assemblies are coupled, the plurality of bores and the select cutouts are configured to reduce or eliminate an ability of the tool assembly to rotate with respect to the master assembly by causing rolling members in the misaligned bores to assume offset positions in the cutouts and to contact opposite sloped surfaces of the cutouts.

2. The robotic tool changer of claim 1 wherein the valleys of the cutouts include a center point, and wherein when the master and tool assemblies are coupled, the plurality of rolling members do not contact the center point of the valleys.

3. The robotic tool changer of claim 1 wherein:
   the plurality of bores includes a first pair of aligned bores and a second pair of aligned bores;
   wherein the first pair of aligned bores includes a pair of aligned rolling members where each of the pair of rolling members contacts right sloped surfaces of a pair of opposing cutouts; and
   wherein the second pair of aligned bores includes a pair of aligned rolling members where each of the pair of rolling members contacts left sloped surfaces of a pair of the opposing cutouts.

4. The robotic tool changer of claim 3 wherein the contact points between the rolling members and sloped surfaces of the cutouts together with connected reference lines form an "X".

5. The robotic tool changer of claim 4 wherein a center axis of the first pair of bores substantially aligns with 10 and 4 o'clock positions on the tool changer; and wherein a center axis of the second pair of bores substantially aligns with 8 and 2 o'clock positions on the tool changer.

6. The robotic tool changer of claim 1 wherein the plurality of cutouts are equally spaced around the bearing race; wherein the plurality of bores are formed in an annular collar that forms a part of the master assembly; and wherein all of the plurality of bores are not equally spaced around the annular collar as some of the bores are skewed relative to opposing cutouts in the bearing race which give rise to the misalignment of a plurality of the rolling members opposing cutouts.

7. The robotic tool changer of claim 1 wherein the sloped surfaces of the cutouts are curved shaped.

8. A method of coupling master and tool assemblies of a robotic tool changer, comprising:
   moving a plurality of rolling members disposed in bores in the master assembly towards a plurality of scalloped cutouts formed in a bearing race of the tool assembly, each scalloped cutout including a valley and opposed sloped surfaces;
   seating the plurality of rolling members on opposed sloped surfaces of the cutouts by the bores being misaligned with the cutouts such that the rolling members contact the sloped surfaces such that the rolling members are offset with respect to the valley of the cutouts; and
   wherein some of the rolling members contact one sloped surface of some cutouts and other rolling members contact the opposite sloped surface of other cutouts thereby generating counterforces that prevent or reduce relative rotation between the master and tool assemblies.

9. The method of claim 8 wherein the rolling members include first and second pairs of aligned rolling members and wherein the sloped surfaces contacted by the first pair of rolling members is opposite of the sloped surfaces contacted by the second pair of rolling members.

10. The method of claim 9 wherein the first and second pairs of aligned rolling members and their respective contact points with the sloped surfaces form an "X" configuration.

11. A robotic tool changer comprising:
    a tool assembly including:
       a bearing race;

a plurality of target cutouts formed in the bearing race, the target cutouts being circumferentially spaced around the bearing race with each target cutout including a valley and opposed sloped surfaces;
a master assembly including:
an annular collar;
an array of bores formed in the collar, each bore configured to contain a rolling member;
a drive mechanism configured to force the rolling members into the target cutouts to couple the master and tool assemblies, and to allow the rolling members to retract to decouple the master and tool assemblies;
the array of bores including a first pair of substantially aligned bores formed in the collar and including a first pair of rolling members, and a second pair of substantially aligned bores formed in the annular collar and including a second pair of rolling members;
wherein when the master and tool assemblies are coupled:
the first and second pairs of bores and the rolling members therein are misaligned with respect to the target cutouts;
the respective rolling members are offset with respect to the valleys in the target cutouts and contact sloped surfaces of the target cutouts;
wherein the rolling members of the first pair of bores contact sloped surfaces of two of the target cutouts that are opposite of the sloped surfaces contacted by the rolling members of the second pair of bores; and
wherein torsional stiffness of the tool changer is increased since the respective points of contact between the rolling members and the sloped surfaces prevent or reduce the tool assembly from rotating relative to the master assembly.

12. The robotic tool changer of claim 11 wherein the first and second pair of bores and the rolling members therein are configured to assume a substantially "X" configuration in the tool changer.

13. The robotic tool changer of claim 11 wherein the first pair of rolling members are configured to contact sloped surfaces of two of the target cutouts and prevent or reduce the tool assembly from rotating in one direction relative to the master assembly; and wherein the second pair of rolling members is configured to contact sloped surfaces of two other target cutouts and prevent or reduce the tool assembly from rotating in the opposite direction relative to the master assembly.

14. The robotic tool changer of claim 11 wherein the sloped surfaces of the target cutouts are curve shaped.

* * * * *